United States Patent [19]
Cottrell et al.

[11] Patent Number: 5,449,586
[45] Date of Patent: Sep. 12, 1995

[54] DIFFUSION TRANSFER INTEGRAL FILM UNIT

[75] Inventors: F. Richard Cottrell, South Easton; Andrew K. Juenger, Hudson; Hugh R. Mackenzie, Belmont; William J. McCune, Jr., South Lincoln; William T. Plummer, Concord, all of Mass.

[73] Assignee: Polaroid Corporation, Cambridge, Mass.

[21] Appl. No.: 335,675

[22] Filed: Nov. 8, 1994

Related U.S. Application Data

[62] Division of Ser. No. 913,363, Jul. 15, 1992, Pat. No. 5,408,447.

[51] Int. Cl.$^6$ .......................... G03C 8/48; G03C 8/52
[52] U.S. Cl. ........................... 430/220; 430/21; 430/217; 430/367
[58] Field of Search ............... 430/220, 217, 21, 367

[56] References Cited

U.S. PATENT DOCUMENTS

| | | | |
|---|---|---|---|
| 2,659,825 | 11/1953 | Land | 430/207 |
| 3,647,437 | 3/1972 | Land | 430/220 |
| 4,312,937 | 1/1982 | Kasper et al. | 430/220 |
| 4,444,866 | 4/1984 | Sakai et al. | 430/220 |
| 4,450,222 | 5/1984 | Mattes et al. | 430/220 |
| 4,619,892 | 10/1986 | Simpson et al. | 430/505 |
| 4,725,880 | 2/1988 | Dischert | 358/43 |
| 4,823,186 | 4/1989 | Muramatsu | 358/43 |
| 4,876,591 | 10/1989 | Muramatsu | 358/43 |
| 4,950,639 | 8/1990 | DeBoer et al. | 503/227 |
| 5,012,333 | 4/1991 | Lee et al. | 358/80 |

*Primary Examiner*—Richard L. Schilling
*Attorney, Agent, or Firm*—Robert A. Sabourin; Edward S. Roman

[57] ABSTRACT

A novel method and apparatus is disclosed for electronically sensing a negative and a positive in a novel integral film structure of the instant development type using light of different wavelengths so as to produce reflected light from the negative and the positive which are indicative of the luminance characteristics and the chrominance characteristics of the image. The novel integral film structure has a filter which allows the negative to be scanned. Specifically, the filter transmits incident infrared radiation to which silver halide emulsion layers are sensitive and blocks the transmission of radiation in the range of wavelengths to which the silver halide emulsion layers are sensitive.

10 Claims, 6 Drawing Sheets

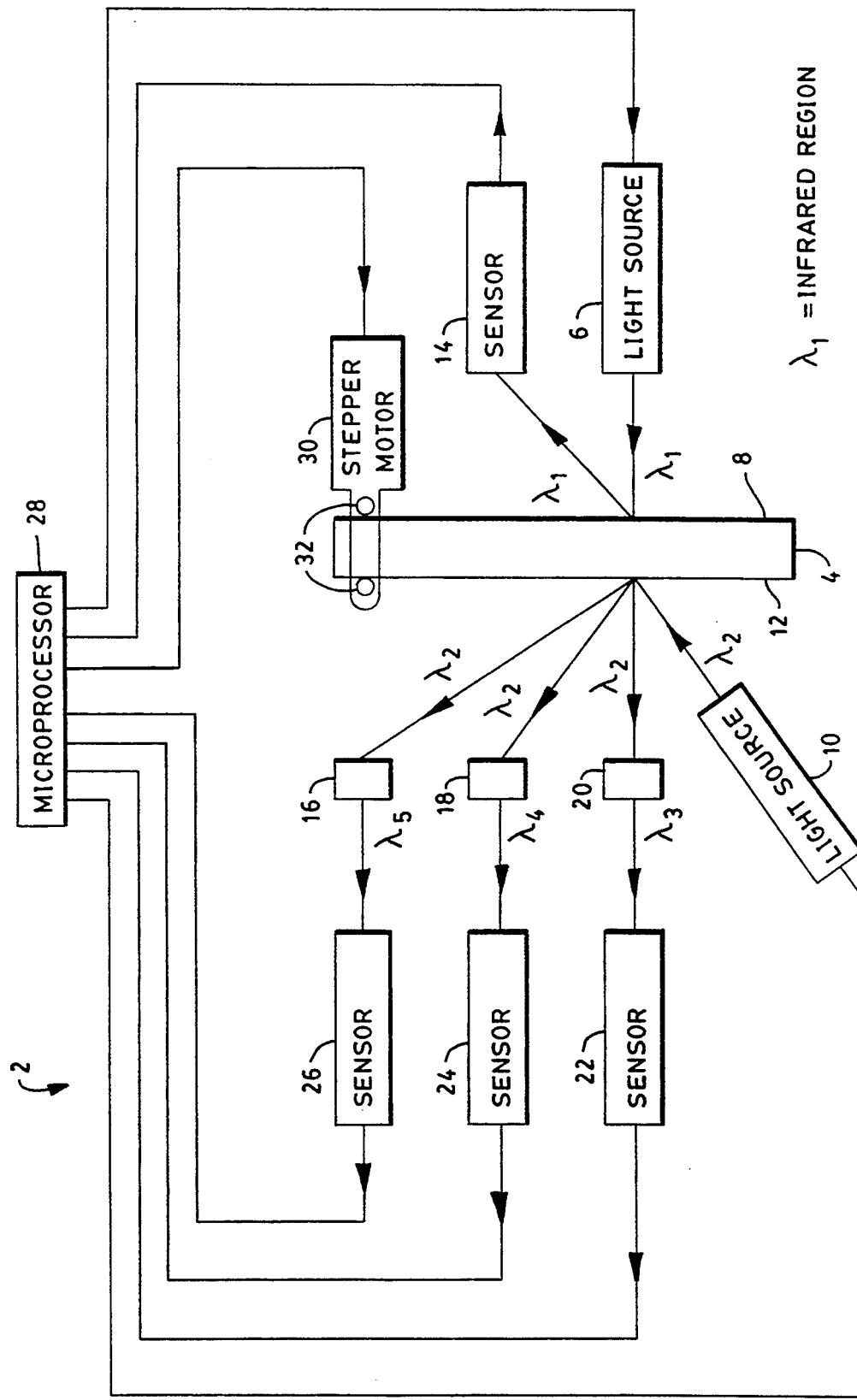

DIFFUSION TRANSFER INTEGRAL FILM UNIT

RELATED APPLICATIONS

This is a divisional application of U.S. patent application Ser. No. 07/913,363 filed 15 Jul. 1992, U.S. Pat. No. 5,408,447, by F. Richard Cottrell et al.

FIELD OF THE INVENTION

This invention relates generally to a novel method and a novel apparatus for electronically sensing both a negative and a positive in an integral film structure by illuminating the negative and the positive with radiation of selected wavelengths such that the light reflected and sensed from the positive is indicative of the chrominance characteristics and the luminance characteristics of the image of the positive and the light reflected and sensed from the negative is indicative of the luminance characteristics of the image of the negative.

BACKGROUND OF THE INVENTION

Presently, research continues on developing a method and an apparatus for producing high resolution copies and in particular enlargements from a silver halide based instant image recording medium. In a silver halide instant image recording medium, such as a diffusion transfer integral film unit, copies of the original image are presently produced by sensing the light reflected from the positive. Typically, light within the visible spectrum which illuminates the positive is reflected therefrom to be sensed in three color separated spectral ranges, such as red, green, and blue to produce a recorded image. The recorded image may then be high pass filtered to increase its sharpness and tonescale mapped to improve its color correlation to the original image. Copies produced according to this method, however, may have no better resolution than the original positive.

The limit of the resolution of the positive in diffusion transfer integral film is primarily due to the lateral diffusion of dye which is inherent to the development of an image within a diffusion transfer integral film. In one type of integral film, a pod within the film unit is ruptured, after exposure, and reagent is forced between the surfaces of a negative and an image receiving layer, forming a new stratum comprising white pigment, opacifying dyes, alkali, water, and polymeric thickener. In exposed areas of the film unit, the silver halide functions so as to immobilize the associated image dye. In unexposed areas of the film unit, mobile image dye migrates through the overlying layers of the negative and through the pigmented reagent layer to reach the image receiving layer where it is mordanted and immobilized.

Some of the mobile image dye does not migrate from locations in the negative, directly onto corresponding locations in the image receiving layer, but instead laterally diffuses through the negative and the reagent layer onto locations in the image receiving layer that are not orthogonal with their initial locations in the negative. This results in the positive having a reduced resolution and one that is substantially lower than the resolution associated with the negative.

The positive is then viewed through a transparent polyester support by light reflected from the white pigment layer while the higher resolution negative remains obscured behind an opaque support layer. Accordingly, copies of the positive have a lower resolution when compared with the resolution of the negative.

SUMMARY OF THE INVENTION

With the foregoing in mind, it is an object of the present invention to use the high resolution negative within a color diffusion transfer integral film unit to obtain improved copies of the positive.

It is a further object of the present invention to provide a method of scanning the negative and the positive in the diffusion transfer integral film unit mentioned above so as to produce copies using the luminance characteristics of the image of the negative and the chrominance characteristics and the luminance characteristics of the image of the positive.

It is yet another object of the present invention to provide an apparatus for scanning the negative and the positive in the diffusion transfer integral film unit mentioned above so as to produce copies using the luminance characteristics of the image of the negative and the luminance characteristics and the chrominance characteristics of the image of the positive.

According to this invention, the foregoing objects may be achieved by a diffusion transfer integral film unit that includes a filter means. The filter means allows for the transmission of incident light to the silver halide emulsion layers in a select range of wavelengths other than the select range of wavelengths to which the silver halide emulsion layers are sensitive and blocks the transmission of light to the silver halide emulsion layers in the wavelengths to which the silver halide emulsion layers are sensitive. The filter means may be disposed in different locations depending on the type of diffusion transfer integral film unit. If the diffusion transfer integral film unit is of the type that is exposed and viewed on the same surface, the filter means is disposed within a photosensitive element. Otherwise, if the diffusion transfer integral film unit is of the type that is exposed on one surface and viewed on an opposite surface, the filter means is disposed in the processing composition.

Alternatively, the foregoing objects may be achieved by a diffusion transfer integral film unit that includes either a removable opaque backing layer or a clear backing layer. The removable opaque backing layer prevents the transmission of light to the silver halide emulsion layers during development of the image and, after the development of the image, is removed from the integral film unit so as to make the negative available for electronic scanning. Alternatively, an integral film unit that employs a clear backing layer is developed in a lighttight imbibing chamber and, after the development of the image, the negative is available for electronic scanning. Either the removable opaque backing layer or the clear backing layer is disposed over a surface of the integral film unit that has the negative disposed thereon. Moreover, the removable opaque backing layer is removed by either peeling off or washing off the backing layer from the integral film unit.

The novel diffusion transfer integral film units can be employed in either a novel scanning apparatus and/or with a novel scanning method. In either the scanning apparatus or the scanning method, a first surface of an image recording medium, such as the diffusion transfer integral film unit, has a negative disposed thereon and an opposite second surface has a positive disposed thereon.

The novel scanner and the novel scanning method scans an image that is disposed on an image recording medium, such as the novel diffusion transfer integral film unit of this invention, and provides a recorded image for processing by downstream circuitry. Specifically, first and second light sources irradiate incident light onto the first and the opposite second surfaces of the image recording medium, respectively, and produce reflected light therefrom. The incident light from the first source has a select band of wavelengths associated therewith which is in the infrared region which allows for the scanning of the negative from the first surface of the image recording medium. The incident light from the second source has a plurality of different wavelengths within the visible spectrum which differ from the select band of wavelengths associated with the incident light from the first source. Sensing means detects the light reflected from the first and second surfaces of the image recording medium and produces analog values designated as, respectively, first signals and second signals. In order to capture the substantially greater resolution inherent in the negative, the sensing means has either different resolutions or associated readout circuits which are sampled at different sampling frequencies by a microprocessor. The first signals are indicative of the luminance characteristics of the image of the negative while the second signals are indicative of the chrominance characteristics and the luminance characteristics of the image of the positive. The first signals and the second signals can then be processed by succeeding circuitry, such as the microprocessor. Such processing would include the combining of selected high frequency luminance characteristics and selected low frequency luminance characteristics from the first and second signals to produce copies and especially enlargements that have the luminance characteristics of the image of the negative and the chrominance characteristics and the luminance characteristics of the image of the positive.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

FIG. 1A is an embodiment of a scanning apparatus according to the teachings of this invention;

DESCRIPTION OF THE PREFERRED EMBODIMENTS

Figure 1B:
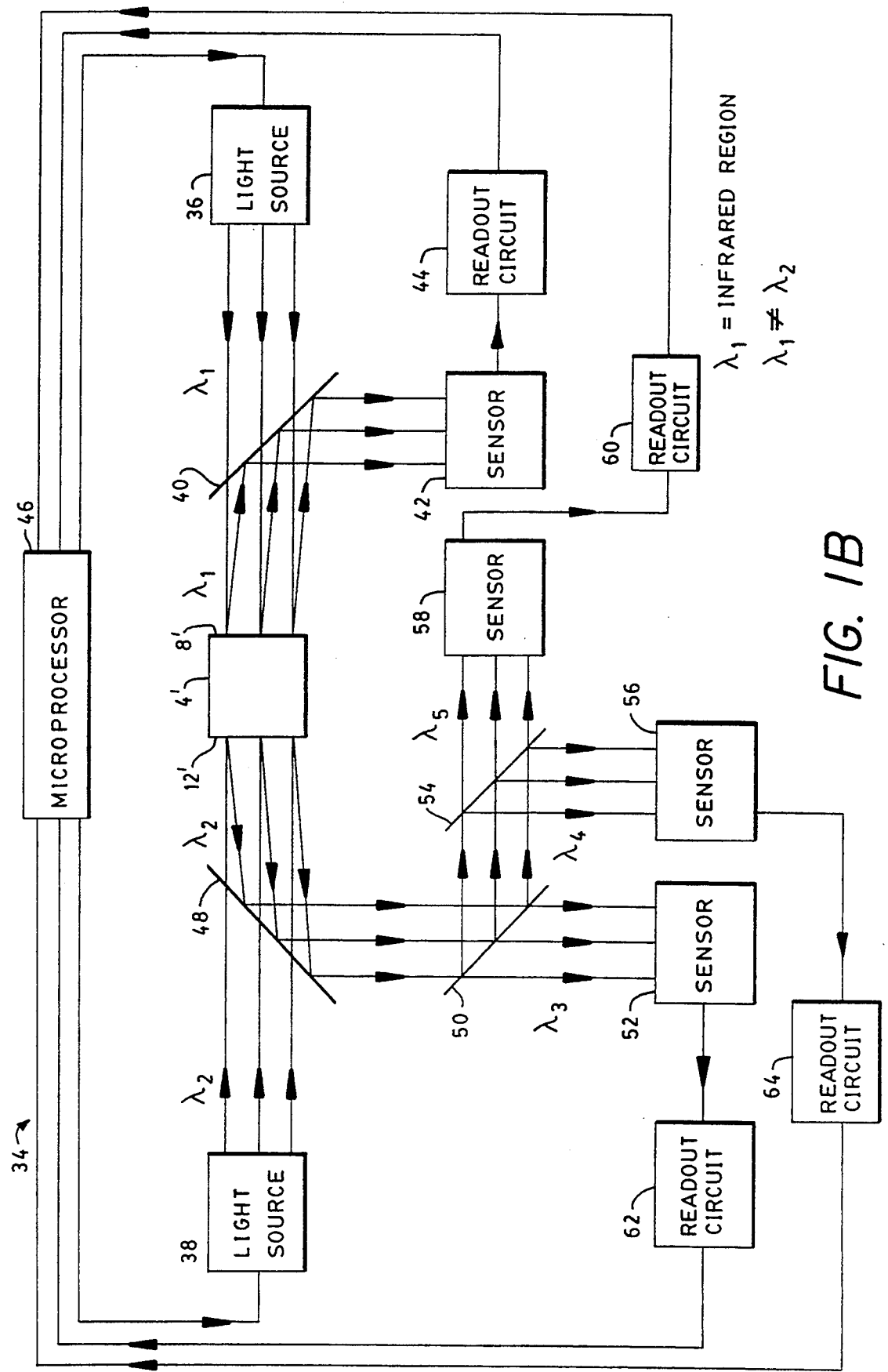
FIG. 1B is alternate embodiment of a scanning apparatus according to the teachings of this invention.
Figure 2:
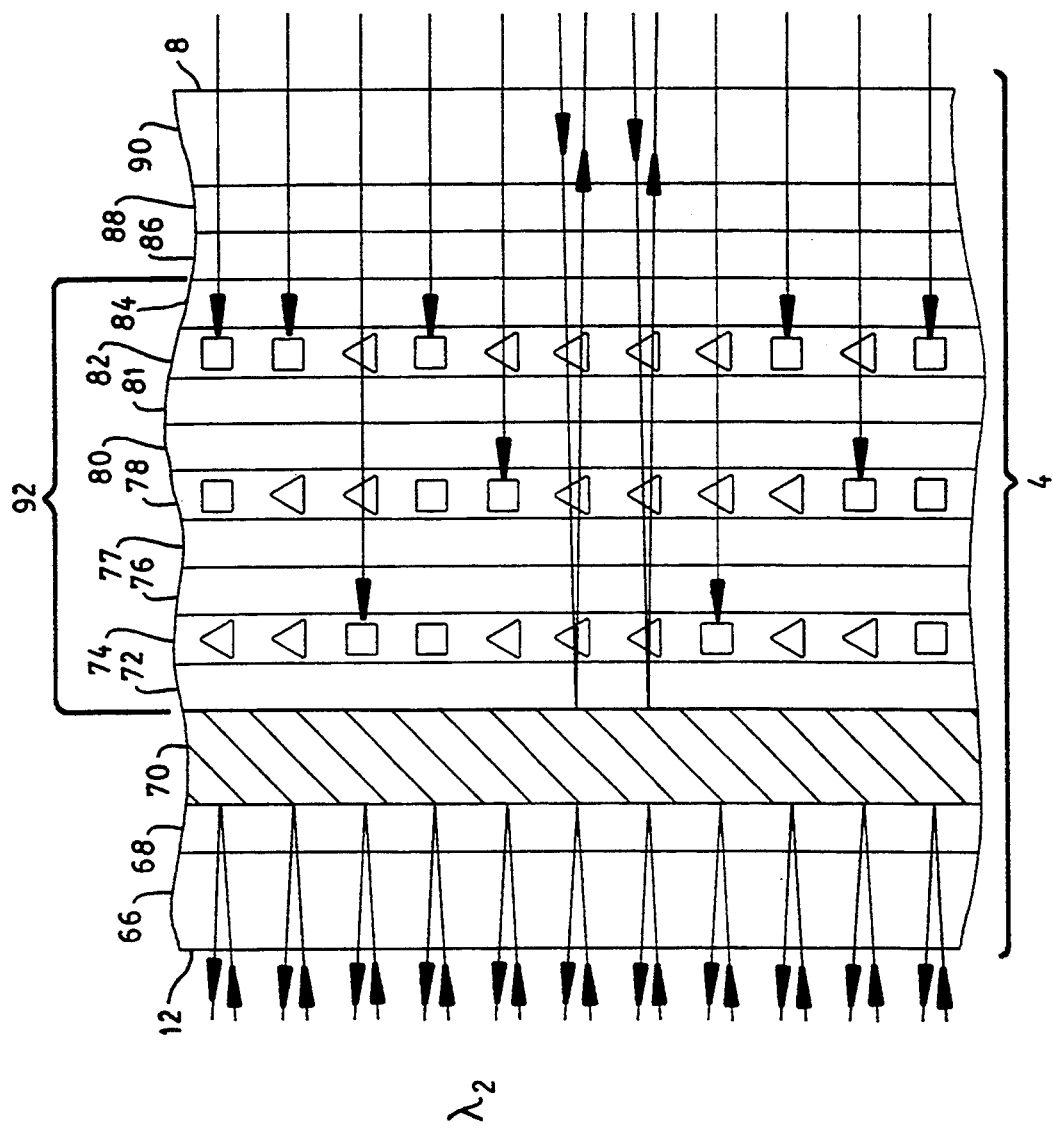
FIG. 2 is schematic cross section of the integral film structure shown in FIGS. 1A and 1B as seen along the line being irradiated.

FIG. 1A shows generally a novel scanning apparatus 2 of the line scan type which scans line by line both a negative 92 (FIG. 2) and a positive 68 (FIG. 2) in an image recording medium 4 so as to produce first signals which are indicative of the luminance characteristics of the image of the negative 92 (FIG. 2) and second signals which are indicative of the chrominance characteristics and luminance characteristics of the image of the positive 68 (FIG. 2). Together, the first signals and the second signals can be processed according to known image processing algorithms to produce copies and especially enlargements that have the luminance characteristics of the image of the negative 92 (FIG. 2) and the chrominance characteristics and the luminance characteristics of the image of the positive 68 (FIG. 2). Typically, the image recording medium 4 of this invention is a diffusion transfer integral film unit.

The line scan apparatus 2 has a first light source 6 which horizontally scans line by line a first surface 8 and a second light source 10 which horizontally scans line by line a second surface 12 of the image recording medium 4. Specifically, the first light source 6 irradiates the first surface 8 that has the negative 92 (FIG. 2) disposed therein with first incident light ($\lambda_1$) in the infrared region, typically, between 800 to 900 nanometers. The first incident light ($\lambda_1$) reflects off the first surface and produces therefrom first reflected light. A linear sensor array 14 detects the first reflected light and produces first analog signal values therefrom which are indicative of the luminance characteristics of the image of the negative 92 (FIG. 2).

Similarly, the second light source 10 irradiates the second surface 12 that has the positive 68 (FIG. 2) disposed therein with second incident light ($\lambda_2$) that has a continuous distribution of wavelengths associated therewith, typically, in the visible spectrum. The second incident light ($\lambda_2$) reflects off the second surface 12 and produces second reflected light. Filters 16, 18, and 20 pass that portion of the second reflected light in the wavelengths associated with red, green, and blue light respectively while blocking the transmission of all other wavelengths. Linear sensor arrays 22, 24, and 26 detect the red light ($\lambda_3$), the green light ($\lambda_4$), and the blue light ($\lambda_5$), respectively, and produce second analog signal values therefrom known as second signals which are indicative of the chrominance characteristics and the luminance characteristics of the image of the positive 68 (FIG. 2). As will be explained fully below, the resolution of sensor 14 may differ substantially from the resolution of sensors 22, 24, and 26.

A microprocessor 28 controls the vertical movement of the image recording medium 4 with respect to the light sources 6, 10. Specifically, the microprocessor 28 controls a stepper motor 30 which drives a pair of rollers 32 which engage border regions (not shown) of the image recording medium 4 and control the vertical movement of the image recording medium 4. The process of repeatedly scanning a line of the image recording medium 4 and then vertically moving the image recording medium 4 continues until the entire image is scanned. During the scanning of the image recording medium 4, the first signals and the second signals are continually provided to the microprocessor 28 which can further enhance the luminance characteristics and chrominance characteristics of the scanned image by using standard well known image processing algorithms. The microprocessor 28 can then provide an enhanced scanned image to a copier (not shown) which can produce copies and especially enlargements that have the luminance characteristics of the image of the negative 92 (FIG. 2) and the chrominance characteristics and the luminance characteristics of the image of the positive 68 (FIG. 2).

The resolution of the sensor 14 should be sufficiently high to match the resolution of the negative 92 (FIG. 2) which is substantially greater than the resolution of the positive 68 (FIG. 2). This occurs because the positive 68 (FIG. 2) suffers from lateral diffusion of the dye developers during the development of the image recording medium whereas the negative 92 (FIG. 2) does not. Accordingly, the sensor 14 must have a high enough resolution to capture the substantially greater resolution inherent in the negative 92 (FIG. 2). Moreover, the resolution of the sensor 14 and the sensors 22, 24, 26 are determined by the resolution of the negative 92 (FIG. 2) and the positive 68 (FIG. 2), respectively. In a Polaroid Spectra picture, the negative silver image has a resolution that is approximately 300% greater than the resolution associated with the positive. Accordingly, to scan the negative from the Polaroid Spectra film, the minimum resolution of sensor 14 should be approximately 300% greater than the resolution associated with sensors 22, 24, and 26.

It should also be obvious to one skilled in the art that variations of the above embodiment are possible. First, the light source 10 which irradiates a continuous distribution of wavelengths, typically, in the visible spectrum onto the second surface 12 of the image recording medium 4 and filters 16, 18, and 20 could be replaced with three discrete light sources (not shown). Each light source (not shown) would irradiate a discrete band of select wavelengths onto the second surface 12. Specifically, each light source would irradiate either a red, a green, or a blue light onto the second surface 12 which would produce a corresponding reflected red, green, or blue light which would be detected by, respectively, the sensors 22, 24, 26. Second, the light sources 6, 10 which irradiate incident light in a line across the image recording medium 4 could be replaced with a pair of area light sources (not shown) and a pair of corresponding aperture masks (not shown). Each aperture mask (not shown) would be disposed between the area light source (not shown) and the image recording medium 4, would encompass an entire surface of the image recording medium 4, and would have a slit (not shown) disposed therein. Accordingly, only that portion of the incident light that is directed at the slit would irradiate onto the image recording medium 4. Third, as will be explained fully in FIG. 1B, the high resolution sensor 14 and the low resolution sensors 22, 24, 26 could be replaced with sensors (not shown) having the same resolution. In such an embodiment, each of such sensors (not shown) would have an associated readout circuit (not shown) so that the microprocessor 28 could separately sample each sensor (not shown) at a different sampling frequency. Regarding FIG. 1A, it should also be understood that the incident light is a line source irradiating a line of pixels on the image recording medium 4 perpendicular to the plane of the drawing.

Referring now to FIG. 1B where like numerals describe previously described elements, a second embodiment of a novel scanning apparatus 34 of the flash type is shown which simultaneously irradiates the entire first surface 8' and the entire second surface 12' of the image recording medium 4' with, respectively, infrared light and light having a continuous distribution of wavelengths in the visible spectrum. As before, first signals are produced which are indicative of the luminance characteristics of the image of the negative 92 (FIG. 2) and second signals are produced which are indicative of the chrominance characteristics and the luminance characteristics of the image of the positive 68 (FIG. 2).

The flash scan apparatus 34 has a first light source 36 and a second light source 38 which irradiates, respectively, the entire first surface 8' and the entire second surface 12' of the image recording medium 4'. Specifically, the first light source 36 irradiates first incident light ($\lambda_1$) in the infrared region through a first circular polarizer 40 and onto the first surface 8' that has the negative 92 (FIG. 2) disposed thereon. The first incident light ($\lambda_1$), typically between 800 to 900 nanometers, reflects off the first surface 8' producing first reflected light therefrom which reflects off the first circular polarizer 40. A first area sensor 42 detects the first reflected light and produces first analog signal values therefrom which are indicative of the luminance characteristics of the image of the negative 92 (FIG. 2). A readout circuit 44, such as a FIFO or memory, receives the first signals from the first area sensor 42 and the microprocessor 46 thereafter samples the first signals at a first sampling frequency.

Similarly, the second light source 38 irradiates second incident light ($\lambda_2$) that has a continuous distribution of wavelengths through a second circular polarizer 48 and onto the second surface 12' that has the positive 68 (FIG. 2) disposed thereon. The second incident light ($\lambda_2$), typically in the visible spectrum, reflects off the second surface 12' and produces second reflected light. The second reflected light reflects off the second circular polarizer 48 and onto a first dichroic beam splitter 50. The first dichroic beam splitter 50 passes that portion of the second reflected light in the band of wavelengths associated with red light ($\lambda_3$) to a second area sensor 52 while reflecting all the other wavelengths to a second dichroic beam splitter 54. The second dichroic beam splitter 54 reflects that portion of the second reflected light in the band of wavelengths associated with green light ($\lambda_4$) to a third area sensor 56 while passing the remaining portion of the second reflected light, namely, the blue light ($\lambda_5$), to a fourth area sensor 58. Each area sensor 52, 56, 58 detects the entire respective portion of the second reflected light and, collectively, the area sensors 52, 56, 58 produce second analog signal values which are indicative of the chrominance characteristics and the luminance characteristics of the image of the positive 68 (FIG. 2). Readout circuits 60, 62, 64 receive the second signals from, respectively, the area sensors 52, 56, 58 and the microprocessor 46, in turn, samples the second signals at a second sampling frequency that differs from the first sampling frequency. The microprocessor 46 can also further enhance the luminance characteristics and the chrominance characteristics of the scanned image by using standard and well known image processing algorithms. The microprocessor 46 can then provide the enhanced scanned image to a copier (not shown) which can produce copies and especially enlargements that have the luminance characteristics of the image of the negative 92 (FIG. 2) and the chrominance characteristics and the luminance characteristics of the image of the positive 68 (FIG. 2).

The first sampling frequency differs from the second sampling frequency because the negative 92 (FIG. 2) has a substantially greater resolution than the resolution of the positive 68 (FIG. 2). This occurs because the positive 68 (FIG. 2) suffers from lateral diffusion of the image dyes during the development of the image recording medium whereas the negative 92 (FIG. 2) does not. Accordingly, in order to capture the substantially greater resolution inherent in the negative 92 (FIG. 2), the microprocessor 46 samples the readout circuit 44 associated with the negative 92 (FIG. 2) at substantially shorter intervals than it samples the readout circuit 60, 62, 64 associated with the positive 68 (FIG. 2). Moreover, the first and second sampling frequencies are determined by the resolution of, respectively, the negative 92 (FIG. 2) and the positive 68 (FIG. 2). In a Polaroid Spectra picture, the negative has a resolution that is approximately 300% greater than the resolution associated with the positive. Accordingly, to scan the negative from the Polaroid Spectra picture, the first sampling frequency should be approximately three times as high as the second sampling frequency.

It should be obvious to one skilled in the art that many other embodiments exist for the novel scanning apparatus which can extract the luminance characteristics from the negative 92 (FIG. 2) with infrared light and the chrominance characteristics and the luminance characteristics from the positive 68 (FIG. 2). For example, a simple raster scan apparatus comprising a pair of laser diodes and a pair of photodiodes can also extract the luminance characteristics from the negative and the chrominance characteristics and the luminance characteristics from the positive. Moreover, as a variation of the novel scanning apparatus 34 shown FIG. 1B, each light source 36, 38 and circular polarizer 40, 48 pair could be replaced with a lens (not shown) and a pair of light sources (not shown) wherein each light source is oblique and the lens is normal with respect to both the image recording medium 4 and the respective area sensor 42, 52. Accordingly, it is intended that the scope of the claims be read to include all of the many other embodiments and variations of the novel scanning apparatus which are too numerous to list here but which are well known to one skilled in the art.

FIG. 2 shows a schematic enlarged cross section of a portion of the image recording medium 4 shown in FIGS. 1A and 1B. Specifically, the image recording medium 4 is an exposed and developed diffusion transfer integral film unit. It is comprised of a first surface 12, a clear polyester layer 66, a positive layer 68, a reflective layer 70, an anti-abrasion layer 72, a blue sensitive silver halide layer 74, a yellow dye layer 76, a green sensitive silver halide layer 78, a magenta dye layer 80, a red sensitive silver halide layer 82, a cyan dye layer 84, a timing layer 86, an acid polymer layer 88, a filter means layer 90, and a second surface 8. The blue sensitive silver halide layer 74, the yellow dye layer 76, the green sensitive silver halide layer 78, the magenta dye layer 80, the red sensitive silver halide layer 82, and the cyan dye layer 84 collectively define a negative 92. Moreover, each silver halide layer 74, 78, 82 is comprised of a plurality of developed silver, represented by the "$\square$" symbol in FIG. 2, and a plurality of undeveloped silver halide grains, represented by the "$\Delta$" symbol in FIG. 2.

The exposed image recording medium 4 differs from the well known diffusion transfer integral film unit in that the normal opaque backing layer (not shown) has been replaced by the filter means layer 90. The filter means layer 90 allows the first incident light ($\lambda_1$) which is in the infrared wavelengths to pass to the silver halide emulsion layers 74, 78, 82 while blocking the transmission of light in the visible wavelengths to which the silver halide emulsion layers 74, 78, 82 are sensitive. This is necessary for two reasons. First, the filter means layer 90 protects the silver halide layers 74, 78, 82 from further non-imagewise exposure by visible light during the development of the image, which would degrade the ultimate image. Second, and much more importantly, since only the developed silver ($\square$) in the image recording medium 4 absorbs the infrared light, the infrared light can very easily and effectively scan the developed silver ($\square$) to determine the luminance characteristics from the negative 92. This occurs because the undeveloped silver halide grains ($\Delta$) in the silver halide emulsion layers 74, 78, 82, the image dye materials, and the other image timing materials in the image recording medium 4 do not substantially absorb or reflect the infrared light. Moreover, the luminance characteristics scanned from the negative 92 are represented by the approximate additive combination of the red, green, and blue sensitive silvers in approximately the following percentages : 28% from the red sensitive silver, 58% from the green sensitive silver, and 14% from the blue sensitive silver.

FIG. 2 illustrates how the infrared light scans the luminance characteristics from the negative 92. Specifically, the first incident light ($\lambda_1$) passes through the filter means layer 90 and into the silver halide emulsion layers 74, 78, 82. If the first incident light ($\lambda_1$) strikes a developed silver ($\square$), the developed silver ($\square$) absorbs the first incident light ($\lambda_1$). However, if the first incident light ($\lambda_1$) only strikes undeveloped silver halide grains ($\Delta$), the first incident light ($\lambda_1$) passes through the silver halide emulsion layers 74, 78, 82 and all the adjacent layers until reaching the reflective layer 70 from which it is reflected to produce first reflected light ($\lambda_1$). The first reflected light ($\lambda_1$) then travels back through all the layers again to the sensor 14 as shown in FIG. 1A or to the sensor 42 as shown in FIG. 1B. When the first reflected light ($\lambda_1$) reaches the sensor 14 (FIG. 1A) or the sensor 42 (FIG. 1B), it contains information therein which is indicative of the luminance characteristics of the negative 92. Specifically, the first reflected light ($\lambda_1$) is present or absent at each location in the image recording medium 4 when, as shown in FIG. 2, the diameter of the first incident light ($\lambda_1$) encompasses only a single developed silver ($\square$) or undeveloped silver halide grain ($\Delta$). Alternatively, the intensity of the first reflected light ($\lambda_1$) is modulated at each location in the image recording medium 4 when the diameter of the first incident light ($\lambda_1$) encompasses several developed silver ($\square$) and/or undeveloped silver halide grains ($\Delta$). Similarly, substantially all of the second incident light ($\lambda_2$) travels through the clear polyester 66 and is modulated by the dye (not shown) in the positive layer 68. It then reflects off the reflective layer 70 to produce the second reflected light ($\lambda_2$). The second reflected light ($\lambda_2$) travels back through all the layers again to the sensors 22, 24, 26 as shown in FIG. 1A or to the sensors 52, 56, 58 as shown in FIG. 1B to produce the second signals which are indicative of the chrominance characteristics and the luminance characteristics of the positive 68.

Figure 3:
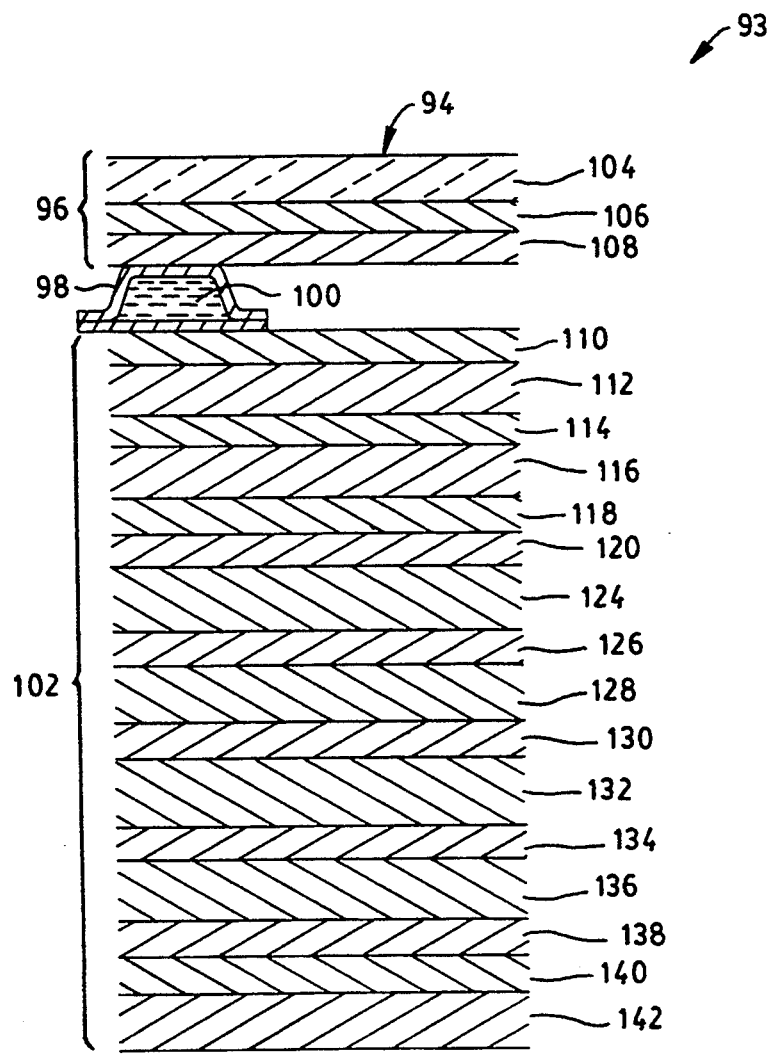
FIG. 3 is a schematic cross section of a first embodiment of the integral film structure which employs an IR transparent support layer and which is similar to the integral film structure shown in FIG. 2.

FIG. 3 shows a schematic detailed cross section of an undeveloped integral film structure 93 which can be exposed and viewed through the same surface 94. The integral film structure 93 is comprised of a transparent image receiving element 96, a pod 98 containing a processing composition 100 therein, and a photosensitive element 102. The transparent image receiving element 96 is comprised of a transparent support 104, an image receiving layer 106, and a clear coat layer 108. The photosensitive element 102 is comprised of an anti-abrasion layer 110, a blue sensitive silver halide emulsion layer 112, a first spacer layer 114 containing colorless developing agent, a yellow dye releasing thiazolidine layer 116, a yellow filter dye layer 118, a second spacer layer 120 containing silver ion scavenger, a green sensitive silver halide emulsion layer 124, a third spacer layer 126, a magenta dye developer 128, a fourth spacer layer 130, a red sensitive silver halide emulsion layer 132, a fifth spacer layer 134, a cyan dye developer layer 136, a timing layer 138, a polymeric acid layer 140, and a filter means layer 142. Integral film structures similar to the film structure 92 shown in FIG. 3 but with an opaque backing layer (not shown) rather than the filter means layer 142 is discussed and explained in *Imaging Processes and Materials*, Neblette's Eighth Edition, Sturge et al., Van Nostrand Reinhold Company, Pages 181-225.

The integral film structure 93 shown in FIG. 3 is an embodiment which is similar to the developed image recording medium 4 shown in FIG. 2 prior to development. When developed, the integral film structure 93 shown in FIG. 3 will have a similar schematic cross section as the image recording medium 4 shown in FIG. 2 wherein, (a) the transparent support layer 104, (b) the image receiving layer 106, (c) the processing composition 100, (d) the anti-abrasion layer 110, (e) the silver halide emulsion layers 112, 124, 132, (f) the dye developer layers 128, 136, (g) the timing layer 138, (h) the polymeric acid layer 140, and (i) the filter means layer 142, shown in FIG. 3 correspond, respectively, to (a) the clear polyester layer 66, (b) the positive layer 68, (c) the reflection layer 70, (d) the anti-abrasion layer 72, (e) the silver halide layers 74, 78, 82, (f) the dye layers 80, 4, (g) the timing layer 86, (h) the polymeric acid layer 88, and (i) the filter means layer 90, shown in FIG. 2. However, the integral film structure 93 shown in FIG. 3 also includes (a) the clear coat 108, (b) the plurality of spacer layers 114, 120, 126, 130, 134, (c) the thiazolidine layer 116, and (d) the yellow filter dye 118 not found in the image recording medium 4 shown in FIG. 2. Moreover, the integral film structure 4 shown in FIG. 2 includes a yellow dye 76 not found in the image recording structure 93 shown in FIG. 3.

The novelty of the integral film structure 93 lies in the infrared light transmissivity and the visible light non-transmissivity of the novel filter means layer 142 in the photosensitive element 102 that otherwise lacks any infrared light absorbing or reflecting material. Upon the exposure and development of the integral film structure 93, the filter means layer 142 transmits infrared light and inhibits transmission of visible light into the photosensitive element 102. Moreover, the lack of infrared light absorbing or reflecting material in the photosensitive element 102 will allow for the unhindered propagation of the infrared light to the developed and the undeveloped silver in the silver halide emulsion layers 112, 124, 132, then to the reflective layer 70 (FIG. 2), and ultimately to the sensor 14 in FIG. 1A or to the sensor 42 in FIG. 1B. In essence, the filter means layer 142 ensures that only infrared light irradiated from the scanning apparatus shown in FIGS. 1A and 1B will be transmitted into the photosensitive element 102 while the lack of infrared light absorbing or reflecting material in the photosensitive element 102 ensures that only the developed silver (□) will affect the transmitted infrared light.

Each silver halide emulsion layer 112, 124, 132 (FIG. 3) is sensitive to a distinct band of visible light. Specifically, the blue sensitive silver halide emulsion layer 112 (FIG. 3) is sensitive to a first band of light having wavelengths approximately between 350 and 500 nanometers, the green sensitive silver halide emulsion layer 124 (FIG. 3) is sensitive to a second band of light having wavelengths approximately between 500 and 580 nanometers, and the red sensitive silver halide emulsion layer 132 (FIG. 3) is sensitive to a third band of light having wavelengths approximately between 580 and 650 nanometers. The filter means layer 142 (FIG. 3) has associated therewith an optical density curve 144 as ideally shown in FIG. 4. The optical density curve 144 has a high optical density region 146 associated with wavelengths to which the silver halide emulsion layers 112, 124, 132 (FIG. 3) are sensitive and a low optical density region 148 associated with the infrared light. Thus, the visible light cannot effect the silver halide emulsion layers 112, 124, 132 (FIG. 3) and the infrared light can scan the developed silver (□) to determine the luminance characteristics from the negative 92 (FIG. 2). Accordingly, the filter means layer 142 (FIG. 3) and the lack of infrared light absorbing or reflecting light in the photosensitive element 102 (FIG. 3) allows the integral film structure 93 (FIG. 3) to be used in conjunction with either the novel raster scanning apparatus 2 shown in FIG. 1A or the novel flash scanning apparatus 34 shown in FIG. 1B.

Figure 4:
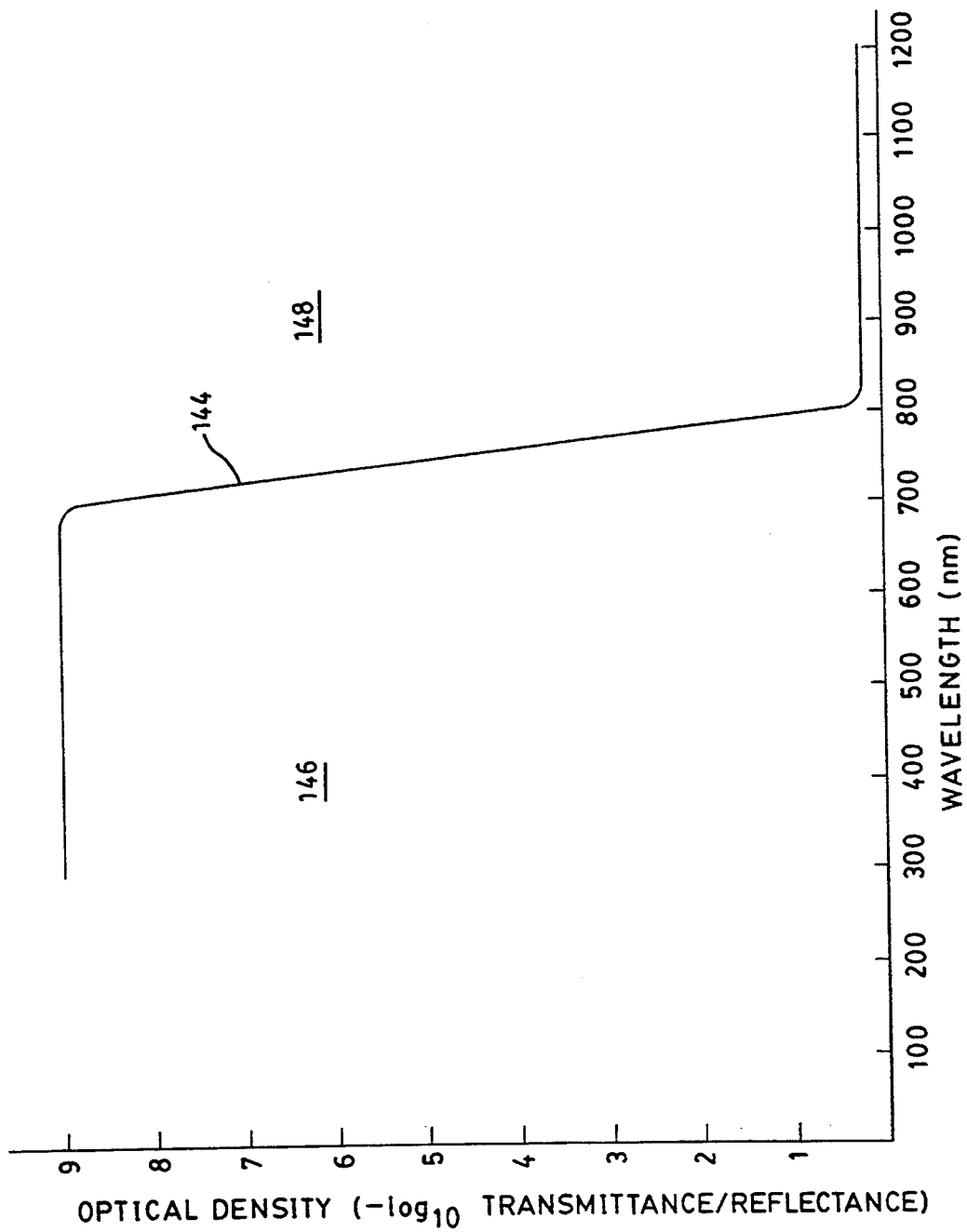
FIG. 4 is a graph showing the optical transmission characteristics of an IR transparent support layer that can be used in the first embodiment.

The filter means layer 142 (FIG. 3) is typically a clear plastic sheet that has a dye set coated thereon or disposed therein wherein the dye set ideally has the optical transmission characteristics as shown by the optical density curve 144 shown in FIG. 4. A tridye set has been developed which has approximately the same shape as the optical density curve 144 and achieves a maximum optical density of 4 between 300 to 700 nanometers. Specifically, the composition of the tridye coating applied to a clear polyester support is as follows:

a) A a) 3.84 grams/square meter
b) B b) 2.42 grams/square meter
c) C c) 7.68 grams/square meter
d) Butvar 76 d) 7.29 grams/square meter where:

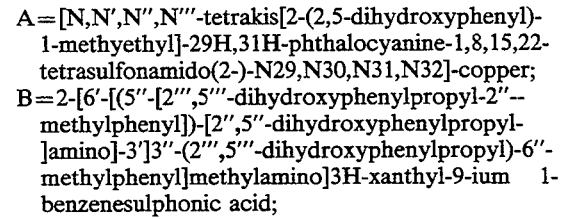

A=[N,N',N'',N'''-tetrakis[2-(2,5-dihydroxyphenyl)-1-methyethyl]-29H,31H-phthalocyanine-1,8,15,22-tetrasulfonamido(2-)-N29,N30,N31,N32]-copper;

B=2-[6'-[(5''-[2''',5'''-dihydroxyphenylpropyl-2''--methylphenyl])-[2'',5''-dihydroxyphenylpropyl-]amino]-3']3''-(2''',5'''-dihydroxyphenylpropyl)-6''-methylphenyl]methylamino]3H-xanthyl-9-ium 1-benzenesulphonic acid;

C=Hydrated chromium complex of 3,(3'-Octadecyl-5-5'-dimethyl-2-thiazolidinyl)-4-hydroxybenzene-N-(2-S-(3-amino-4-hydroxyphenyl)sulfonamidoethyl)sulfonamide; and

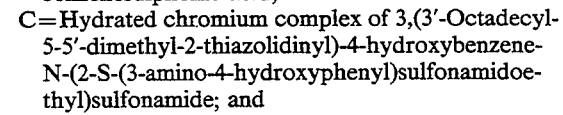

Butvar=Poly(vinyl butyral).

The maximum optical density associated with a filter means layer of a given integral film structure is related to the film speed of the integral film structure. Specifically, the maximum optical density associated with a filter means layer is proportional to the film speed of the integral film structure. If the integral film structure has a high film speed, the maximum optical density associated with the filter means layer will also be high whereas, if the integral film structure has a low film speed, the maximum optical density associated with the filter means layer will be correspondingly low.

Figure 5:
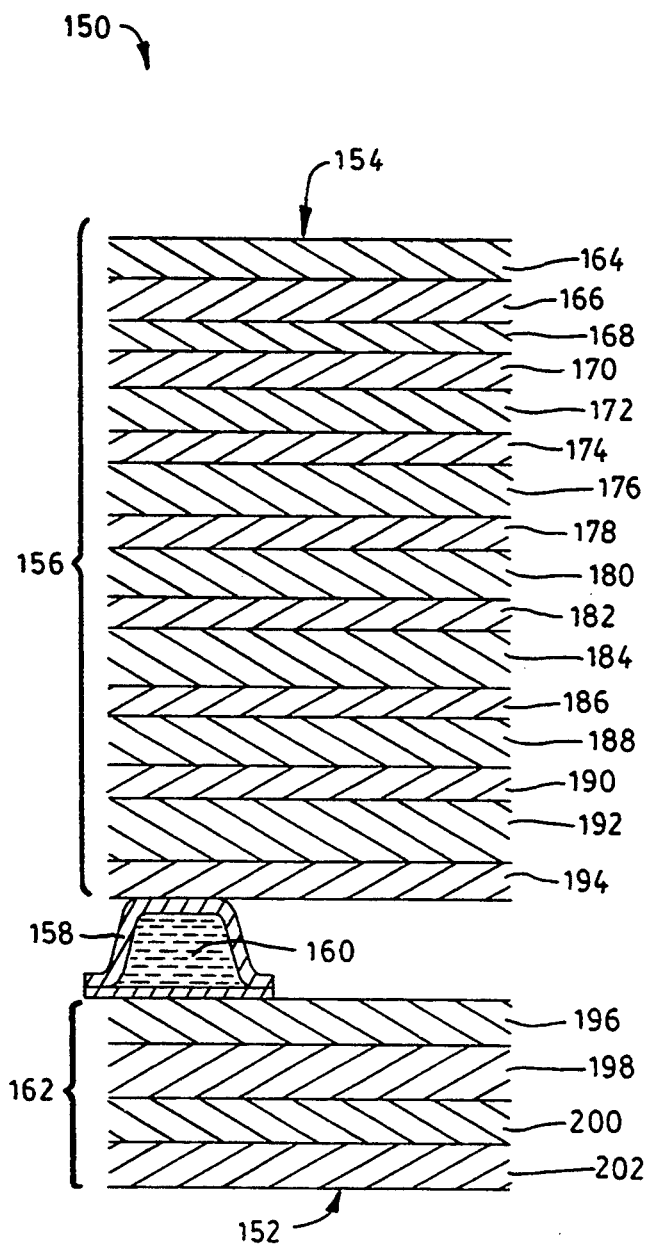
FIG. 5 is a schematic cross section of a second embodiment of an integral film structure which employs an IR transparent processing composition and which is similar to the integral film structure shown in FIG. 2.

FIG. 5 shows a schematic detailed cross section of an undeveloped integral film structure 150 of the instant development type which can be exposed through a first surface 152 and viewed through a second surface 154. The integral film structure 150 is comprised of an emulsion-image receiving element 156, a pod 158 containing a processing composition 160 that also has a filtering means (not shown) therein, and a transparent neutralizing element 162. The transparent neutralizing element 162 is comprised of a timing layer 196, an acid polymer layer 198, a clear polyester layer 200, and a backing layer 202. The emulsion-image receiving element 156 is comprised of a clear polyester layer 164, an image receiving layer 166, a white reflective layer 168, an IR transparent opaque layer 170, a cyan dye releaser layer 172, a first spacer layer 174, a red sensitive silver halide emulsion layer 176, a first interlayer 178, a magenta dye releaser layer 180, a second spacer layer 182, a green sensitive silver halide emulsion layer 184, a second interlayer 186, a yellow dye releaser layer 188, a third spacer layer 190, a blue sensitive silver halide emulsion layer 192, and an ultra violet absorber layer 194. Integral film structures similar to the film structure 150 shown in FIG. 5 but with an opaque backing layer (not shown) rather than filter means (not shown) is discussed and explained in *Imaging Processes and Materials*, Neblette's Eighth Edition, Sturge et al., Van Nostrand Reinhold Company, pages 181-225.

The integral film structure 150 shown in FIG. 5 is an embodiment which is similar to the developed image recording medium 4 shown in FIG. 2 prior to its development. When developed, the integral film structure 150 shown in FIG. 5 will have a similar schematic cross section as the image recording medium shown in FIG. 2 except that the red, green, and blue sensitive silver halide emulsion layers and the associated cyan, magenta, and yellow dye layers in FIG. 5 are in an order opposite to the associated red, green, and blue sensitive silver halide layers and the associated cyan, magenta, and yellow dye layers found in FIG. 2. Specifically, (a) the clear polyester layer 164, (b) the image receiving layer 166, (c) the white reflective layer 168, (d) the blue sensitive silver halide emulsion layer 192, (e) the yellow dye layer 188, (f) the green sensitive silver halide emulsion layer 184, (g) the magenta dye layer 180, (h) the red sensitive silver halide emulsion layer 176, (i) the cyan dye layer 172, (j) the timing layer 196, and (k) the acid polymer layer 198 in FIG. 5 correspond, respectively, with (a) the clear polyester layer 66, (b) the positive layer 68, (c) the reflective layer 70, (d) the blue sensitive silver halide layer 74, (e) the yellow dye layer 76, (f) the green sensitive silver halide layer 78, (g) the magenta dye layer 80, (h) the red sensitive silver halide layer 82, (i) the cyan dye layer 84, (j) the timing layer 86, and (k) the acid polymer layer 88, in FIG. 2. However, the integral film structure 150 shown in FIG. 5 also includes: (a) the spacer layers 174, 190, (b) the interlayers 178, 186, (c) the IR transparent opaque layer 170, (d) the UV absorber layer 194, (e) the clear polyester layer 200, and (f) the backing layer 202 not found in the image recording medium 4 shown in FIG. 2. Moreover, the integral film structure 4 shown in FIG. 2 includes the anti abrasion layer 72 not found in the integral film structure 150 shown in FIG. 5.

The novelty of the undeveloped integral film structure 150 lies in the infrared light transmissivity and the visible light nontransmissivity of the filter means (not shown) disposed in the processing composition 160 and in the lack of infrared light absorbing or reflecting material in the neutralizing element 162 and, except for the white reflective layer 168, in the emulsion-image receiving element 156. Upon the exposure and development of the integral film structure 150, the filter means (not shown) transmits infrared light into and reflects visible light away from the emulsion-image receiving element 156. Moreover, the lack of infrared light absorbing or reflecting material in the emulsion-image receiving element 156 and the neutralizing element 162 allows for the unhindered propagation of the infrared light to the developed and the undeveloped silver in the silver halide emulsion layers 176, 184, 192, then to the white reflective layer 168, and ultimately to the sensor 14 in FIG. 1A or to the sensor 42 in FIG. 1B. In essence, the filter means (not shown) in the processing composition 160 ensures that only infrared light irradiated from the scanning apparatus shown in FIGS. 1A and 1B will be transmitted into the photosensitive element 102 while the lack of infrared light absorbing or reflecting material in the neutralizing element 162 and, except for the white reflective layer 168, in the emulsion-image receiving element 156 ensures that only the developed silver (□) will affect the transmitted infrared light.

Each silver halide emulsion layer 176, 184, 192 (FIG. 5) is sensitive to a distinct band of visible light. Specifically, the blue sensitive silver halide emulsion layer 192 (FIG. 5) is sensitive to a first band of light having wavelengths approximately between 370 and 500 nanometers, the green sensitive silver halide emulsion layer 184 (FIG. 5) is sensitive to a second band of light having wavelengths approximately between 500 and 580 nanometers, and the red sensitive silver halide emulsion layer 176 (FIG. 5) is sensitive to a third band of light having wavelengths approximately between 580 and 680 nanometers. The filter means (not shown) disposed in the processing composition 160 has associated therewith an optical density curve 144 shown in FIG. 4. The optical density curve 144 has a high optical density region 146 associated with wavelengths to which the silver halide emulsion layers 176, 184, 192 (FIG. 5) are sensitive and a low optical density region 148 associated with the infrared light. Thus, visible light cannot affect the silver halide emulsion layers 176, 184, 192 (FIG. 5) and the infrared light can scan the luminance characteristics from the negative 92 (FIG. 2). Accordingly, the filter means (not shown) disposed in the processing composition 160 (FIG. 5) and the lack of infrared light absorbing or reflecting light in the neutralizing element 162 (FIG. 5) and in the emulsion-image receiving element 156 (FIG. 5) allows the integral film structure 150 (FIG. 5) to be used in conjunction with either the novel raster scanning apparatus 2 shown in FIG. 1A or the novel flash scanning apparatus 34 shown in FIG. 1B.

Modified conventional integral film structures (not shown) may also be used in conjunction with either the novel raster scanning apparatus 2 shown in FIG. 1A or the novel flash scanning apparatus 34 shown in FIG. 1B to obtain improved copies of the positive. Specifically, the opaque backing layer commonly found in conventional integral film structures can be replaced with either a removable opaque backing layer or a clear backing layer so that the infrared light from the scanning apparatus 2, 34 can scan the developed and undeveloped silver in the negative. If a conventional integral film structure has a clear backing layer, then the modified integral film structure is developed in a lighttight imbibing chamber before being scanned. Alternatively, if a conventional integral film structure has a removable opaque backing layer, then the removable opaque backing layer remains disposed on the integral film structure during development of the image and is removed before the integral film structure is scanned. The removable opaque backing layer may be removed by either peeling off or washing off the backing layer from the integral film structure. Peel off black backs for integral film structures are known in the art and have been disclosed in U.S. Pat. Nos. 3,053,659; 3,900,323; 3,976,490; and 4,211,837. Similarly, wash off black backs for integral film structures are also known in the art and have been disclosed in U.S. Pat. No. 3,881,932.

Other embodiments of the invention including additions, subtractions, deletions, and other modifications of the preferred disclosed embodiments of the invention will be obvious to those skilled in the art and are within the scope of the following claims.

What is claimed is:

1. A diffusion transfer integral film unit comprising:
   a) a photosensitive element comprising a support member, a blue sensitive silver halide emulsion layer adjacent to a yellow dye layer, a green sensitive silver halide emulsion layer adjacent to a magenta dye layer, a red sensitive silver halide emulsion layer adjacent to a cyan dye layer, each said silver halide emulsion layer being sensitive to incident visible radiation within a first select range of wavelengths different from the range of wavelengths to which the other silver halide emulsion layers are sensitive, and filter means to transmit incident infrared radiation to the silver halide emulsion layers in a second select range of wavelengths and to block the transmission of said visible radiation to the silver halide emulsion layers;
   b) an image receiving element transparent to said visible radiation disposed in superposed relationship with the photosensitive element such that photoexposure of the photosensitive element is effected through the transparent image receiving element; and
   c) means for providing a processing composition for distribution between the photosensitive element and the transparent image receiving element.

2. The film unit of claim 1 wherein the support member is comprised of a substantially clear plastic layer and the filter means comprises a dye set disposed on the clear plastic layer, the dye set being transmissive to said infrared radiation.

3. The film unit of claim 24 wherein the filter means blocks incident visible radiation in the first select range of wavelengths between 300 and 700 nanometers and transmits incident infrared radiation in the second select range of wavelengths between 750 and 1000 nanometers.

4. The film unit of claim 1 wherein the photosensitive element is free from infrared light absorbing or reflecting material except for the filter means.

5. A diffusion transfer integral film unit comprising:
   a) an emulsion-image receiving element comprising a support layer, an image receiving layer, a red silver halide emulsion layer adjacent to a cyan dye release layer, a green silver halide emulsion layer adjacent to a magenta dye release layer, a blue silver halide emulsion layer adjacent to a yellow dye release layer, each said silver halide emulsion layer being sensitive to incident visible radiation within a first select range of wavelengths different from the range of wavelengths to which the other silver halide emulsion layers are sensitive;
   b) a neutralizing element transparent to said visible radiation disposed such that photoexposure of the emulsion-image receiving element is effected through the transparent neutralizing element; and
   c) means for providing a processing composition for distribution between the emulsion-image receiving element and the transparent neutralizing element, the processing composition comprising filter means to transmit incident infrared radiation to the silver halide emulsion layers in a second select range of wavelengths and to block the transmission of said visible radiation to the silver halide emulsion layers.

6. The film unit of claim 5 wherein the filter means blocks incident visible radiation in the first select range of wavelengths between 300 and 700 nanometers and transmits incident infrared radiation in the second select range of wavelengths between 750 and 1000 nanometers.

7. The film unit of claim 6 wherein the transparent neutralizing element and the emulsion-image receiving element are free from infrared light absorbing or reflecting material except for a black opaque layer in the emulsion-image receiving element.

8. A diffusion transfer integral film unit comprising:
   a) a photosensitive element comprising a red silver halide emulsion layer adjacent to a cyan dye release layer, a green silver halide emulsion layer adjacent to a magenta dye release layer, a blue silver halide emulsion layer adjacent to a yellow dye release layer, each silver halide emulsion layer being sensitive to incident visible radiation within a first select range of wavelengths different from the range of wavelengths to which the other silver halide emulsion layers are sensitive;
   b) an image receiving layer adjacent to a support layer;
   c) means for providing processing composition for distribution between the photosensitive element and the combination of the image receiving layer and the support layer; and
   d) filter means disposed in either a filter layer or in the processing composition to transmit incident infrared radiation to the silver halide emulsion layers in a second select range of wavelengths and to block the transmission of said visible radiation to the silver halide emulsion layers in the wavelengths to which the silver halide emulsion layers are sensitive.

9. The film unit of claim 8 wherein the filter means blocks incident visible radiation in the first select range of wavelengths between 300 and 700 nanometers and transmits incident infrared radiation in the second select range of wavelengths between 750 and 1000 nanometers.

10. The film unit of claim 8 wherein the photosensitive element is free from infrared light absorbing or reflecting material.

* * * * *

UNITED STATES PATENT AND TRADEMARK OFFICE
CERTIFICATE OF CORRECTION

PATENT NO. : 5,449,586

DATED : September 12, 1995

INVENTOR(S) : F. Richard Cottrell, et al

It is certified that error appears in the above-indentified patent and that said Letters Patent is hereby corrected as shown below:

Column 9, line 40, "4" should be --84--; and
Column 13, line 54, "24" should be --1--.

Signed and Sealed this

Nineteenth Day of December, 1995

BRUCE LEHMAN

Attest:

Attesting Officer

Commissioner of Patents and Trademarks